United States Patent [19]

Baker

[11] 4,384,083
[45] May 17, 1983

[54] THERMOPLASTIC ADHESIVE

[75] Inventor: Richard L. Baker, Lambertville, Mich.

[73] Assignee: Applied Polymer Technology, Incorporated, Ashland, Ohio

[21] Appl. No.: 286,050

[22] Filed: Jul. 22, 1981

[51] Int. Cl.$^3$ .............................. B65C 9/25; C09J 5/12
[52] U.S. Cl. .............................. 525/420.5; 156/331.7; 156/332; 427/208.2; 428/423.1; 428/423.5; 428/423.7; 428/424.6; 428/424.8; 525/424; 525/440
[58] Field of Search .............................. 156/331.7, 332; 427/208.2; 260/22 D, 22 TN; 525/424, 440, 420.5; 428/423.1, 423.5, 423.7, 424.6, 424.8

[56] References Cited

U.S. PATENT DOCUMENTS

| | | | |
|---|---|---|---|
| 2,506,486 | 5/1950 | Bender et al. | 528/104 |
| 2,744,882 | 5/1956 | Bender et al. | 528/205 |
| 2,852,492 | 9/1958 | Williams et al. | 528/289 |
| 2,954,364 | 9/1960 | Coleman et al. | 528/292 |
| 3,372,148 | 3/1968 | Wiener | 428/473 |
| 3,377,303 | 4/1968 | Peerman et al. | 546/186 |
| 3,663,513 | 5/1972 | Kazama et al. | 525/440 |
| 3,887,755 | 6/1975 | Zamer | 156/331.7 |
| 4,135,033 | 1/1979 | Lawton | 427/208.2 |
| 4,156,064 | 5/1979 | Falkenstein et al. | 156/331.7 |
| 4,279,801 | 7/1981 | Kramer et al. | 525/440 |

Primary Examiner—Ronald W. Griffin
Attorney, Agent, or Firm—Maky, Renner, Otto & Boisselle

[57] ABSTRACT

A thermoplastic adhesive composition that is particularly suitable for use as a hot melt adhesive is disclosed that comprises at least about 10% by weight of a polyether-based thermoplastic polyurethane and another component selected from the group consisting of: (A) a polyamide formed by the condensation of a compound of the formula

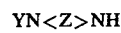

where Z is selected from the group consisting of

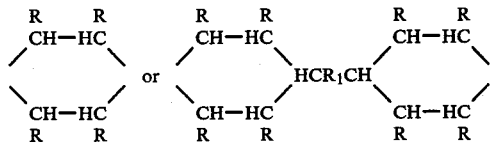

where R is selected from the group consisting of hydrogen and alkyl groups having from 1 to 6 carbon atoms and $R_1$ is a divalent aliphatic hydrocarbon group having at least 1 carbon atom, Y is selected from the group consisting of hydrogen, $R'NH_2$ and $R'OH$ where $R'$ is a divalent alkylene radical having from 1 to 6 carbon atoms, with an amide forming derivative of a polymeric fat acid; (b) a thermoplastic copolyester made from the polyesterification reaction between terephthalic acid, cyclohexanedimethanol, a diol in addition to cyclohexanedimethanol and a dibasic acid in addition to terephthalic acid; or (C) a polyester-polyamide formed by heating a mixture of about 50 to about 99% by weight of component (A) with about 1 to about 50% by weight of component (B) at a temperature above the melting point of components (A) and (B) for a sufficient period to effect ester interchange.

28 Claims, No Drawings

THERMOPLASTIC ADHESIVE

TECHNICAL FIELD

This invention relates to adhesives and, more particularly, to thermoplastic adhesives. Specifically, this invention relates to thermoplastic adhesives comprising a polyether-based thermoplastic polyurethane and another component selected from the group consisting of a polyamide, a thermoplastic copolyester, a polyester-polyamide, and mixtures thereof.

BACKGROUND OF THE INVENTION

Urethane may be formulated into almost every known type adhesive. Contact adhesives, pressure-sensitive adhesives, two-component thermosetting adhesives and thermoplastic adhesives. Urethanes are generally not suitable for joining materials such as rigid metals, but are useful as adhesives where two unlike materials are to be joined. Thermoplastic polyurethanes are particularly suited for use where the joined materials are to be subjected to much flexure, and in applications requiring elongation to allow for difference in expansion and contraction. A general discussion of the use of urethanes as adhesives can be found in, for example, the publication by E. N. Doyle, "The Development and Use of Polyurethane Products," McGraw-Hill Book Company, (1971), pp. 212-224. A problem with thermoplastic polyurethane is that often times sufficient bond for particular applications cannot be effected. Thermoplastic polyurethane adhesives also tend to exhibit levels of water sensitivity that are unacceptable for various applications.

U.S. Pat. No. 3,377,303 discloses a specific group of polymeric fat acid polyamides which possess properties suitable for hot melt adhesive applications. A piperazine type product includes a copolymerizing acid and amine. A dipiperidyl type product is suitable with either a copolymerizing acid or amine with a polymeric fat acid, as well as with compositions which include a dimer diamine and dicarboxylic acid other than a polymeric fat acid. The polyamides disclosed in this patent are described as being suitable for bonding vinyl based polymer substrates. A problem with the polyamides described in this patent is that they tend to exhibit levels of water sensitivity that are not suitable for certain applications. Departing now from the teachings of this patent the applicant has discovered that polyamides of the type described in this patent can be combined with certain thermoplastic polyurethanes to produce adhesive materials that exhibit, among other things, excellent water sensitivity characteristics.

Thermoplastic polyesters such as polyethylene terephthalate and polybutylene terephthalate are produced by the polyesterification reaction between a single glycol and a single di-basic acid. Copolyesters are those polyesters whose synthesis uses more than one glycol and/or more than one di-basic acid. A copolyester chain is less regular than the monopolyester chain and therefore has a reduced tendency to crystallize. Some of the copolyesters, as a result, normally are amorphous, some are normally crystalline, and some can be made to be either crystalline or amorphous, depending upon the processing conditions. Thermoplastic copolyesters are prepared and processed in much the same manner as the thermoplastic monopolyesters. Of particular significance is a polymer of cyclohexane dimethanol and terephthalic acid with another acid substituted for a portion of the terephthalic acid that otherwise would have been required. U.S. Pat. No. 3,372,148 discloses the preparation of a terephthalic acid-aliphatic acid copolyester which is indicated to be useful as an adhesive. The copolyester disclosed in this patent is made from ethylene glycol, neopentyl glycol, terephthalic acid and an aliphatic dicarboxylic acid.

Polyester-polyamides are known. For example, U.S. Pat. No. 2,852,492 discloses the preparation of N,N'-bis-(p-carboalkoxybenzoyl) piperazines which are indicated to be useful in the manufacture of linear polyesters containing chain amide groups. This patent indicates that the quenchability of well known polyester compositions, particularly those prepared by condensing a glycol with an aromatic dicarboxylic acid, can be improved by forming a copolyester of such reactants with the compounds described in this patent. U.S. Pat. No. 2,954,364 discloses the preparation of polyester-polyamides by heating ethylene glycol with a compound selected from the group consisting of N,N'di-(5-carboxypentyl) oxamide, N,N'-di-(6-carboxyhexyl) oxamide, and their methyl or beta-hydroxyethyl esters. This patent indicates that the polyester-polyamides so formed can be processed by conventional means into fibers, films and injection moldings.

SUMMARY OF THE INVENTION

The present invention relates to polyether-type thermoplastic polyurethane based adhesives with improved adhesive and water resistant characteristics. Broadly stated, the present invention contemplates the provision of an adhesive composition comprising at least about 10% by weight of a polyether-based thermoplastic polyurethane and another component selected from the group consisting of: (A) a polyamide formed by the condensation of a compound of the formula

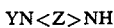

where Z is selected from the group consisting of

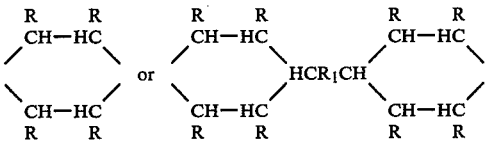

where R is selected from the group consisting of hydrogen and alkyl groups having from 1 to 6 carbon atoms and $R_1$ is a divalent aliphatic hydrocarbon group having at least 1 carbon atom, Y is selected from the group consisting of hydrogen, $R'NH_2$ and $R'OH$ where $R'$ is a divalent alkylene radical having from 1 to 6 carbon atoms, with an amide forming derivative of a polymeric fat acid; (B) a thermoplastic copolyester made from the polyesterification reaction between terephthalic acid, cyclohexanedimethanol, a diol in addition to cyclohexanedimethanol and a dibasic acid in addition to terephthalic acid; or (C) a polyester-polyamide formed by heating a mixture of about 50 to about 99% by weight of component (A) with about 1 to about 50% by weight of component (B) at a temperature above the melting point of components (A) and (B) for a sufficient period to effect ester interchange. The adhesive compositions of the present invention are useful as dry adhesives by using preformed films and powders as well as solution adhesives. In a particularly advantageous embodiment of the present invention the foregoing composition is provided in the form of a hot melt adhesive. The term "hot melt adhesive" as used in this specification and in the appended claims means a thermoplastic adhesive that is normally solid at room temperatures but that becomes sufficiently fluid when heated to become pourable or spreadable.

Further, the present invention contemplates the provision of a method for forming a thermoplastic adhesive comprising extruding the foregoing composition. The present invention also relates to a method of making a composite product comprising extruding the foregoing adhesive composition on to a substrate. Advantageously, the adhesive composition of the present invention and the substrate are coextruded.

Further, the present invention contemplates the provision of a method of making a composite structure comprising extruding the foregoing adhesive composition, applying the extruded adhesive composition to at least a portion of a first component of said composite structure as said extruded adhesive composition is extruded, placing a second component of the composite structure in contact with said extruded adhesive composition, and applying pressure to said second component to bond said second component to said first component. Advantageously, the foregoing method includes the step of cooling the extruded adhesive composition prior to placing the second component in contact with the extruded adhesive composition, and then applying heat to the extruded adhesive composition to bond the second component to the first component.

DESCRIPTION OF THE PREFERRED EMBODIMENTS

The adhesive composition described herein is a thermoplastic polyether-type polyurethane based adhesive that is particularly suitable for use as a hot melt adhesive. This adhesive composition consists of a mixture of at least about 10% by weight, preferably about 10 to about 60% by weight, of a thermoplastic polyether-type polyurethane, and another component selected from the group consisting of (A) from about 40 to about 90% by weight, preferably about 70 to about 90% by weight of the polyamide referred to above, (B) from about 25 to about 90% by weight, preferably about 40 to about 60% by weight, of a thermoplastic copolyester of the type referred to above, or (C) up to about 75% by weight, preferably about 40 to about 60% by weight, of a polyester-polyamide of the type referred to above. Mixtures of components (A), (B) and (C) can also be employed with the thermoplastic polyurethane component. For example, a suitable adhesive composition consists of about 10 to about 25% by weight, preferably about 25% by weight, of the thermoplastic polyurethane, up to about 50% by weight, preferably about 25% by weight of component (A), and from about 25% to about 90% by weight, preferably about 50% by weight, of component (B). Another suitable adhesive composition consists of about 10 to about 60% by weight, preferably about 50% by weight, of the thermoplastic polyurethane component, up to about 90% by weight of component (A), and up to about 75%, preferably about 40 to about 60% by weight of component (C). The foregoing components can be prepared separately in a suitable form such as amorphous thermoplastic pellets that can be further processed and then physically mixed at the time of heating and application, or they can be prepared in a combined form such as amorphous thermoplastic pellets, which can be further processed by suitable means (e.g., extrusion) for application.

The Polyurethane Component

The polyether-type thermoplastic polyurethane compositions which are employed in accordance with the present invention are prepared by reacting a mixture comprising an organic compound having two or more active hydrogen atoms and an organic polyfunctional isocyanate. The organic compounds having two or more active hydrogen atoms (as determined by the Zerewitinoff method) are polyethers having at least one hydroxyl group.

The polyols used in making polyurethanes are generally primary and secondary hydroxyl-terminated polyoxyalkylene ethers having from 2 to 4 hydroxyl groups and a molecular weight of from about 200 to 10,000, preferably about 1,000 to about 3,000. They are liquids or are capable of being liquefied or melted.

Examples of polyoxyalkylene polyols include linear and branched polyethers having a plurality of ether linkages and containing at least two hydroxyl groups and being substantially free from functional groups other than hydroxyl groups. Among the polyoxyalkylene polyols which are useful in the practice of this invention are the polypropylene glycols, the polypropyleneethylene glycols, and the polybutylene glycols. Polymers and copolymers of alkylene oxides are also adaptable for use with the present invention as well as the block copolymers of ethylene oxide and propylene oxide and the like. Among the polymers and copolymers that deserve some special mention are the ethylene oxide, propylene oxide and butylene oxide adducts of ethylene glycol, propylene glycol, diethylene glycol, dipropylene glycol, triethylene glycol, 2-ethylhexanediol-1,3-glycerol, 1,2,6-hexanetriol, trimethylolpropane, trimethylolethane, pentaerythritol, triethanolamine, triisopropanolamine, ethylenediamine, and ethanolamine. Linear and branched copolyethers of other alkylene oxides are also useful in making the products of this invention as well as the polypropylene diols, triols and tetrols end-blocked with ethylene oxide to provide primary hydroxyl groups in the polymer and having molecular weights of from about 750 to 3,000.

Branched polyethers have the advantage of making possible cross linking without the interaction of urea or urethane groups with the isocyanate groups. This has the advantage of making a larger proportion of the isocyanate used available for the evolution of carbon dioxide and the reducing of the overall amount of isocyanate that is required in the preparation of the polymer. Mixtures of polyether polyols can be used.

The organic polyisocyanates which can be reacted with organic polyols to form the polyether-based thermoplastic polyurethanes of the present invention include alkylaromatic and aromatic polyisocyanates. Typical organic polyisocyanates include aromatic polyisocyanates such as 2,4- and 2,6-toluene diisocyanate, 2,2'-, 2,4'-, 4,4'-diphenylmethane-diisocyanate, triphenylmethane-triisocyanate, biphenyl-diisocyanate m- or p-phenylene-diisocyanate and 1,5-naphthalene-diisocyanate. Preferred are the toluene diisocyanates and mixtures of 2,2'-, 2,4'- and 4,4'-diphenylmethane diisocyanate and polyphenyl-polymethylene-polyisocyanates. The polyisocyanates may be used individually or as mixtures.

Advantageously, the polymeric polyisocyanates have a functionality greater than 2.0. Exemplary polyisocyanates include the following: crude diphenylmethane-4,4'-diisocyanate, commonly referred to as crude MDI having a functionality of about 2.5 to 2.6; crude toluene diisocyanate, commonly referred to as crude TDI, containing about 85% TDI and about 15% polymeric isocyanate and having a functionality of about 2.1; and polymethylene polyphenyl isocyanate, referred to as PAPI, having an isocyanate functionality greater than 2.4.

The polyisocyanate is used in an amount sufficient to react with the active hydrogen atoms (as determined by the Zerewitinoff method, J.A.C.S. Vol. 49, p. 3181 (1927)) in the polyols, and any other active hydrogen-containing material in the polyurethane formulation to provide the desired degree of crosslinking, chain extension, urea groups, and so forth to obtain the desired flexibility and/or other physical properties.

Catalysts for the polyetherpolyol-polyisocyanate reaction can be any catalyst heretofore used in the art. Examples of such catalysts are (1) tertiary phosphines such as trialkylphosphines, dialkylbenzylphosphines, and the like; (2) strong bases such as the alkali and alkaline earth metal hydroxides, alkoxides, and phenoxides; (3) acidic metal salts of strong acids such as stannic chloride, stannous chloride, antimony trichloride, bismuth nitrate, bismuth chloride, and the like; (4) alcoholates and phenolates of various metals such as $Ti(OR)_4$, $Sn(OR)_2$, $Al(OR)_3$, and the like, wherein R is alkyl or aryl, and the reaction products of alcoholates with carboxylic acids, beta-diketones and 2-(N,N-dialkylamino) alkanols, such as the well known chelates of titanium obtained by said or equivalent procedures; (5) organometallic derivatives of tetravalent tin, trivalent and pentavalent As, Sb, and Bi, and metal carbonyls of iron and cobalt; and (6) alkali and alkaline earth metal salts of aliphatic and alicyclic monocarboxylic acids. These catalysts are used in an amount of from about 0.1 to 0.9 part by weight per 100 parts by weight of the polyetherpolyol.

At least one organic tertiary amine may be included in the reaction mixture as a catalyst. The amount of organic amine catalyst may comprise, per 100 parts by weight of organic polyol, about 0.05 to 3.2 parts by weight.

In the urethane compositions of the invention there may be used a wide variety of organic tertiary amine catalysts. Such organic amines include, among others, triethylene diamine, triphenyl amine, triethylamine, N,N,N',N'-tetramethyl-1,3-butane diamine, N-methyl morpholine, N-ethyl morpholine, N-acetyl morpholine, N-octyl morpholine, N-coco morpholine, N-phenyl morpholine, N-hydroxyl ethyl morpholine, N-hydroxyl methyl morpholine, 4,4'-dithiodimorpholine, dimethyl piperazine, N,N,N',N'-tetramethyl propane diamines, trimethyl aminoethyl piperazine, N,N-dimethyl ethanolamine, dimethyl hexadecylamine, 1-(2-ethyl-1-hexenyl) piperazine, tri-n-octylamine, trimethylamine, N,N-di-methyl benzyl amine, triethanolamine, 1,2,4-trimethylpiperazine, N-methyl dicyclohexylamine, and mixtures thereof.

Formation of the polyurethane compositions of the present invention may be accomplished in a one-shot system by reacting the polyol with excess polyfunctional isocyanate. The mixing of the constituents may be carried out at elevated temperatures or at room temperature. In a typical two-step operation, the polyol may be reacted with excess polyfunctional iso-cyanate in the absence of water.

The polyurethane compositions of the present invention are preferably prepared in the form of pellets which have been reacted to a degree which permits further processing using extrusion or molding techniques.

The Polyamide Component (A)

The polyamide compositions which are employed in accordance with the present invention are prepared by the condensation, at a temperature in the range of about 200° F. to about 575° F., of: a compound of the formula

wherein Z is selected from the group consisting of

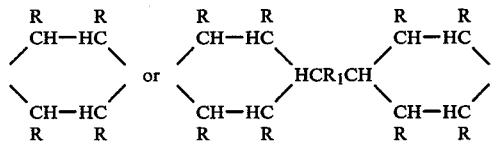

wherein R is selected from the group consisting of hydrogen and alkyl groups having from 1 to 6 carbon atoms, $R_1$ is a divalent aliphatic hydrocarbon group having at least 1 carbon atom and is preferably an alkylene group having from 2 to 8 carbon atoms, and Y is selected from the group consisting of hydrogen, $R'NH_2$ and $R'OH$ wherein $R'$ is a divalent alkylene radical having from 1 to 6 carbon atoms; with an amide forming derivative of a polymeric fat acid.

The amide forming derivatives of polymeric fat acids include the polymeric fat acids themselves, along with the anhydrides, halides (preferably chloride), alkyl and aryl esters thereof (preferably having from 1 to 8 carbon atoms) and the diamines derived from the polymeric fat acids. The preparation of polymeric fat acids is disclosed, for example, in U.S. Pat. No. 3,157,681, which is incorporated herein by reference. Commercially available polymeric fat acids prepared from tall oil fatty acids generally have a composition as follows:

|  | Percent by Weight |
|---|---|
| $C_{18}$ monobasic acids (monomer) | 5–15 |
| $C_{36}$ dibasic acids (dimer) | 60–80 |
| $C_{54}$ and higher polybasic acids (trimer) | 10–35 |

The relative ratios of monomer, dimer and trimer in such unfractionated polymeric fat acids are dependent on the nature of the starting material and the conditions of polymerization. For the purposes of the present specification and the appended claims, the term "monomeric fat acids" refers to unpolymerized monomeric acids. The term "dimeric fat acids" refers to the dimeric fat acids. The term "trimeric fat acids" refers to the residual higher polymeric forms consisting primarily of trimer acids, but containing some higher polymeric forms. The term "polymeric fat acids" is intended to be generic to polymerized acids obtained from "fat acids" and consists of a mixture of monomeric, dimeric and trimeric fat acids. The term "fat acids" is intended to include saturated, ethylenically unsaturated and acetylenically unsaturated, naturally occurring and synthetic monocarboxylic aliphatic acids containing from 8 to 24 carbon atoms. Suitable saturated fat acids include branched and straight chain acids such as caprylic acid, pelargonic acid, capric acid, lauric acid, myristic acid, palmitic acid, isopalmatic acid, stearic acid, arachidic acid, behenic acid and lignoceric acid. The ethylenically and acetylenically unsaturated fat acids which may be polymerized and their method of polymerization are described in U.S. Pat. No. 3,157,681.

The amounts of monomeric fat acids, dimeric fat acids and trimeric fat acids present in polymeric fat acids may be determined by conventional gas-liquid chromatography of the corresponding methyl esters. Another method of determination is a micromolecular distillation analytical method disclosed by Paschke et al, J. Am. Oil, Chem. Soc., XXXI (No. 1), 5 (1954). Preferably, the polymeric fat acids used in accordance with the present invention have a dimeric fat acid content greater than 65% by weight, most preferably greater than 90% or 95% by weight.

Suitable compounds of the formula YN Z NH that are useful in making component (A) include: piperazine; 1,3-di(4-piperidyl) propane; 1,2-di-4-piperidylethane; 1,4-di-4-piperidylbutane; 1-(N-beta-hydroxyethyl-4-piperidyl)-3-(4-piperidyl)propane, and mixtures thereof.

The diamines derived from the polymeric fat acids function as amine amide-forming derivatives. When such amine amide-forming derivatives are employed, it is necessary to employ a difunctional dicarboxylic compound other than a polymeric fat acid. Even if such amine amide-forming derivatives are not employed, the inclusion of such difunctional dicarboxylic compounds can be advantageous in the preparation of the polyamides used in accordance with the present invention. The difunctional dicarboxylic compounds contemplated herein have from 2 to 20 carbon atoms and include the acids, esters, anhydrides or halide derivative of the acids. These dicarboxylic compounds may be aliphatic, cycloaliphatic or aromatic, preferably hydrocarbon, compounds. Preferably the dicarboxylic compounds are compounds of the formula $R_2OOC-COOR_2$ or $R_2OOCR_3COOR_2$ where $R_2$ is selected from the group consisting of hydrogen, alkyl, or aryl groups containing from 1 to 8 carbon atoms and $R_3$ is a divalent, hydrocarbon, aliphatic, cycloaliphatic or aromatic radical having from 1 to 20 carbon atoms. Further, the anhydrides or halides (preferably chlorides) of the acids may be employed. The preferred esters are the alkyl esters having from 1 to 4 carbon atoms, the most preferred being the methyl, ethyl, or acetate esters. Preferably $R_3$ is a divalent aliphatic or aromatic hydrocarbon radical having from 6 to 12 carbon atoms. The straight chain, aliphatic hydrocarbon radicals are the most preferred. Illustrative of the dicarboxylic compounds are oxalic, malonic, adipic, succinic, suberic, sebacic, azelaic, pimelic, terephthalic, isophthalic, phthalic, naphthalene dicarboxylic acids and 1,4 or 1,3-cyclohexane dicarboxylic acid.

Particularly where the amide-forming derivatives of the polymeric fat acid is a dicarboxylic functioning derivative, other diamines may be employed as an amino reactant. Such diamines are aliphatic, cycloaliphtic, or aromatic diamines having from about 2 to 20 carbon atoms. Illustrative thereof are the alkylene diamines such as ethylene diamine, diaminopropane, diaminobutane, hexamethylene diamine, terephthalyl diamine, isophthalyl diamine, cyclohexyl bis (methyl amine), and bis (amino ethyl) benzene. Ideally the preferred diamines may be represented by the formula $H_2NR_4NH_2$ wherein $R_4$ is an aliphatic, cycloaliphatic, or aromatic hydrocarbon radical having from 2 to 20 carbon atoms. Representative of such diamines are ethylenediamine, 1,2-diaminopropane, 1,3-diaminopropane, 1,3-diaminobutane, tetramethylene diamine, pentamethylene diamine, hexamethylene diamine, decamethylene diamine, octadecamethylene diamine, metaxylylene diamine, paraxylylene diamine, cyclohexylene diamine, bis (aminoethyl) benzene, cyclohexyl bis (methyl amine), diamino-dicyclohexyl methane, and methylene dianiline. The most preferred diamines are those in which $R_4$ is an alkylene radical having from 2 to 6 carbon atoms. Ethylenediamine is particularly preferred.

The polyamides used in accordance with the present invention are preferably prepared by heating the reactants at a temperature in the range of about 200° F. to about 575° F. for about 3 to 10 hours, the last 1 or 2 hours preferably being conducted under vacuum or reduced pressure. Preferably, the amide forming derivative of the polymeric fat acid is employed at a level of about 30 to about 70 molar percent of the total reactants; the compounds of the formula YN<Z>NH are preferably employed at a level of about 20 to about 80 molar percent; the dicarboxylic compounds, when used, are preferably employed at a level of about 20 to about 40 molar percent; and the diamines, when used, are preferably employed at a level of about 20 to about 40 molar percent. The preparation of polyamides of the type herein described is disclosed in U.S. Pat. No. 3,377,303, which is incorporated herein by reference.

The Thermoplastic Copolyester Component (B)

The thermoplastic copolyester compositions which are employed in accordance with the present invention are prepared by reacting a mixture comprising terephthalic acid, cyclohexanedimethanol, and at least one other diol, in addition to cyclohexanedimethanol, and another dibasic acid, in addition to terephthalic acid.

The dibasic acids used herein are dicarboxylic acids having from 2 to 20 carbon atoms. These dicarboxylic acids may be aliphatic, cycloaliphatic or aromatic, preferably hydrocarbon, compounds. Preferably the dicarboxylic acids are compounds of the formula $R_5OOC-COOR_5$ or $R_5OOCR_6COOR_5$ where $R_5$ is selected from the group consisting of hydrogen, alkyl, or aryl groups containing from 1 to 8 carbon atoms and $R_6$ is a divalent, hydrocarbon, aliphatic, cycloaliphatic or aromatic radical having from 1 to 20 carbon atoms. Preferably $R_6$ is a divalent aliphatic or aromatic hydrocarbon radical having from 6 to 12 carbon atoms. The straight chain, aliphatic hydrocarbon radicals are the most preferred. Illustrative of the dicarboxylic acids are oxalic, malonic, adipic, succinic, suberic, sebacic, azelaic, pimelic, terephthalic, isophthalic, phthalic, naphthalene dicarboxylic acids and 1,4 or 1,3-cyclohexane dicarboxylic acid. Azelaic acid is preferred.

A wide variety of diols can be used to produce the thermoplastic copolyester component of the present invention. Examples of such diols include the aliphatic, cycloaliphatic and aromatic diol compounds. Representative examples of such diols include ethylene glycol, propylene glycol, trimethylene glycol, 1,2-butylene glycol, 1,3-butanediol, 1,4-butanediol, 1,5-pentanediol, 1,6-hexanediol, 1,2-hexylene glycol, 1,10-decanediol, 1,2-cyclohexanediol, 2-butene-1,4-diol, 3-cyclohexane-1,1-dimethanol, 4-methyl-3-cyclohexene-1,1-dimethanol, 3-methylene-1,5-pentanediol, 3,2-hydroxyethylcyclohexanol, 2,2,4-trimethyl-1,3-pentanediol, 2,5-dimethyl-2,5-hexanediol and the like; alkylene oxide modified diols such as diethylene glycol, (2-hydroxyethoxy)-1-propanol, 4-(2-hydroxyethoxy)-1-butanol, 5-(2-hydroxyethoxy)-1-pentanol, 3-(2-hydroxypropoxy)-1-propanol, 4-(2-hydroxypropoxy)-1-butanol, 5-(2-hydroxypropoxy)-1-pentanol, 1-(2-hydroxyethoxy)-2-butanol, 1-(2-hydroxyethoxy)-2-pentanol, 1-(2-hydroxymethoxy)-2-hexanol, 1-(2-hydroxyethoxy)-2-octanol, and the like. Exemplary diphenylol compounds include 2,2-bis(p-hydroxyphenyl) propane; bis(p-hydroxyphenyl)methane and the various diphenols and diphenylol methanes disclosed in U.S. Pat. Nos. 2,506,486 and 2,744,882, respectively; these patents are incorporated herein by reference. Ethylene glycol and 1,6-hexanediol are preferred.

The cyclohexane dimethanol units are present in the amount of about 20 to about 60 mole percent, preferably about 30 mole percent, of the total number of moles of acid component in the copolyester. The other diol units are present in the corresponding amount of from 40 to 80 mole percent, preferably about 70 mole percent of the total number of moles of acid component. The molar ratio of the terephthalic acid units to other dibasic acid units is from about 95:5 to about 70:30, preferably about 80:20.

The reaction can be catalyzed or uncatalyzed. Suitable catalysts include the strong acid or acid salt catalysts often used in polyesterification reactions. A preferred catalyst is tetrakis (2-ethylhexyl)-titanate.

The reaction is usually carried out by heating the reactants and removing water, usually applying a vacuum in the later stages. The ester-interchange reaction is carried out at a temperature in the range of about 300° F. to about 425° F., preferably about 390° F. to about 425° F., at atmospheric pressure. The polymerization reaction is carried out at pressures generally below about 15 m.m. Hg., preferably below about 1 m.m. Hg., at temperatures in the range of about 425° F. to about 540° F., preferably about 515° F. to about 520° F.

The thermoplastic copolyesters contemplated herein are preferably provided in the form of amorphous pellets which can be further processed by, for example, extrusion.

The Polyester-Polyamide Component (C)

The polyester-polyamide compositions which are employed in accordance with the present invention are prepared by heating a mixture of component (A) and component (B) at a temperature in the range of from the point at which components (A) and (B) melt and about 600° F., preferably at about 500° F. The melting point for component (A) is generally in the range of about 250° F. to about 300° F., while that of component (B) is generally in the range of about 210° F. to about 290° F. The components are heated for a sufficient period of time to effect an interchange between the ester and the amide. The time needed for ester-interchange will vary depending on the heating conditions, presence or absence of catalyst, and the particular components employed. The initial stage of the reaction is usually complete in a short period, for example 5 to 30 minutes. Polymerization is then effected to the desired degree by continuing the heating, optionally at reduced pressure, until the polymer reaches the fiber-forming stage. The polymerization can be effected by first obtaining a low viscosity polymer and then continuing heating with the polymer in molten form until the desired molecular weight and inherent viscosity is achieved.

The process can be facilitated by use of an ester-interchange catalyst, a large number of such catalysts being known in the art. Typical ester-interchange catalysts include the metal hydrides, such as calcium hydride, lithium hydride, sodium hydride or the like; metal oxides such as antimony trioxide, litharge, cerium oxide, germanium oxide and the like; double metal catalysts such as lithium aluminum stearate, calcium aluminum acetate and similar catalysts containing an alkali or alkaline earth metal and an amphoteric metal, alcoholates of one or more of such metals as sodium, potassium, lithium, calcium, titanium, tin, magnesium, aluminum, zinc and the like, alkaline reacting salts such as borates and carbonates of alkali metals, free metals such as sodium, potassium, lithium, calcium, cobalt, tin, germanium, cerium, magnesium, lead, antimony and the like, as well as salts of these and similar metals and other well known ester-interchange catalysts such as zirconium compounds and the like. The catalyst or catalyst mixture can be employed at a concentration of about 0.001% to about 0.05% by weight based on the weight of the reactants. Larger amounts of catalyst can also be used.

The adhesive compositions of the present invention may contain dyes and other standard additives, for example antioxidants, stabilizers, processing aids and the like. It is of course necessary to use additives that are stable at the application conditions employed. A large number of such additives are available commercially and are well known to those of ordinary skill in the art.

The adhesive compositions of the present invention are preferably made by preparing a physical mixture of the above identified components and extruding that mixture at a temperature in the range of about 300° F. to about 425° F. using a screw that permits the mixture to be initially heated to a temperature in the range of about 300° F. to about 425° F. and then subjecting the mixture to high shear mixing conditions. The extrudate can then be applied directly to a substrate as a hot melt adhesive or can be pelletized for further processing. Such further processing may include, for example, an additional extrusion step whereby the extrudate is extruded as a hot melt adhesive on a substrate. The extrudate can be in the form of a preformed film, converted to a powder, or dissolved in solution. Application of the adhesive to the surface or substrates to be adhered is effected using known techniques, for example, heated flow-coating equipment, heated airless spray, roller coating, or reverse roller coating.

The adhesive compositions of the present invention are particularly suitable for use as hot melt adhesives. In application the heated extrudate is applied to one surface to be adhered. A second surface is brought into contact under pressure, the cold contact surfaces cause the adhesive to gel almost instantaneously. In some instances, the surfaces to be adhered must be heated slightly so that the adhesive will not gel before the contact is made. One or both of the surfaces to be adhered can be coextruded with the adhesive composition of the present invention.

The application of a preferred hot melt adhesive within the scope of the present invention as used in the production of a hose assembly is described in patent application Ser. No. 286,004 filed July 22, 1981 by the applicant entitled "Lined Hose Including A Thermoplastic Liner Bonded to a Casing by Hot Melt Adhesive and Method for Making Same," such copending application is fully incorporated herein by reference thereto.

The adhesive compositions of the present invention are particularly suitable for bonding among others any of the following substrates or any combination of the following substrates: polyurethane based substrates, polyvinyl chloride based substrates, nylon based substrates and polyester based substrates, polyolefin based substrates, and substrates based on polyurethanepolyolefin blends. The substrates to be adhered can be smooth, porous, woven, etc., and of any shape or size. The adhesives of the present invention are particularly suitable for applications wherein good water resistant characteristics are preferred or required.

By way of further illustration of the present invention, the following examples are provided. Unless otherwise indicated, all parts and percentages are by weight.

EXAMPLE 1

Part A: A polyether-based thermoplastic polyurethane is prepared by charging to a reactor 1 mole of polytetramethylene ether glycol and 1.5 moles of 1,4 butane diol and heating the charge to a temperature in the range of 230° F. to 285° F. 2.5 moles of molten methylene di-para-phenylene isocyanate at a temperature of about 140° F. is added to the reactor and within about 30 seconds polyurethane resin is formed. The polyurethane resin, in molten state, is poured on to a hot plate, the temperature of the hot plate being 230° F. The molten mixture solidifies on the hot plate. The solidified mixture is removed from the hot plate and granulated. The granulated mixture is mixed with 0.5 parts by weight per 100 parts of granulated mixture of Irganox 1010, a product of Ciba Geigy identified as an antioxidant.

Part B: A polyamide is prepared by charging to a vessel 0.6 moles of dimer acid based on tall oil having a dimer fat acid content greater than 65% by weight, 0.04 moles isostearic acid and 0.4 moles of azelaic acid. The mixture is heated to a temperature of 120° F.–125° F. and then covered with a nitrogen blanket. Agitation is commenced and 1.02 moles of piperazine and 0.32 moles of ethylenediamine are added to the mixture. The mixture is heated to a temperature of 440° F. over a period of 2.5 to 3 hours and then heated for an additional 2 hours at 445° F.–450° F. The resulting polymer is removed from the vessel, solidified and granulated. The following additives are admixed: 0.002% by weight of Naugard 445, a product of Uniroyal identified as an antioxidant; and 0.00005% by weight of polydimethyl siloxane.

Part C: Thirteen parts by weight of the polyurethane from Part A and 87 parts by weight of the polyamide from Part B are physically mixed and extruded at a temperature ranging from 300° F. to 425° F. with a screw that permits the temperature of the polymer to reach the range of 300° F. to 425° F. under low shear conditions, then subjects the molten polymer to high shear conditions.

EXAMPLE 2

Part A: A thermoplastic copolyester is prepared by mixing the following: 0.8 moles of terephthalic acid, 0.2 moles of azelaic acid, 1.5 moles of ethylene glycol, 0.3 moles of cyclohexane dimethanol, 0.6 moles of 1,6-hexanediol, and 0.76 parts by weight per 100 parts by weight of the acids of tetrakis (2-ethylhexyl)-titanate. The batch is polymerized at 515° F. to 520° F. at 1 m.m. Hg. with sparging to a viscosity of 700–800 ps @ 450° F. The batch is cooled to 490° F.–495° F. within 1 to 1.5 hours and the resulting resin is granulated. The following materials are admixed with the resin: 0.1% by weight based on the weight of the resin of Irganox 1010; and 0.8% by weight based on the weight of the resin of Weston 618, a product of Ciba Geigy identified as an antioxidant.

Part B: Twenty-five parts by weight of the polyurethane produced in Part A of Example 1, 25 parts by weight of the polyamide produced in Part B of Example 1 and 50 parts by weight of the copolyester produced in Part A of Example 2 are physically mixed with each other and extruded under the conditions employed in Part C of Example 1.

EXAMPLE 3

Part A: A polyester-polyamide is made by mixing 70 parts by weight of the polyamide produced in Part B of Example 1 and 30 parts by weight of the copolyester produced in Part A of Example 2 and heating the mixture at 500° F. to effect ester interchange.

Part B: Fifty parts by weight of the polyurethane produced in Part A of Example 1 are physically mixed with 50 parts by weight of the polyester-polyamide produced in Part A of Example 3. The mixture is extruded under the conditions in Part C of Example 1.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

I claim:
1. An adhesive comprising at least about 10% by weight of a polyether-based thermoplastic polyurethane and another component selected from the group consisting of:
(A) a polyamide formed by the condensation of a compound of the formula

where Z is selected from the group consisting of

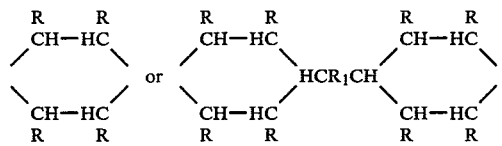

where R is selected from the group consisting of hydrogen and alkyl groups having from 1 to 6 carbon atoms and $R_1$ is a divalent aliphatic hydrocarbon group having at least one carbon atom, Y is selected from the group consisting of hydrogen, $R'NH_2$ and $R'OH$ where $R'$ is a divalent alkylene radical having from 1 to 6 carbon atoms, with an amide forming derivative of a polymeric fat acid;

(B) a thermoplastic copolyester made from the polyesterification reaction between terephthalic acid, cyclohexanedimethanol, a diol in addition to cyclohexanedimethanol and a dibasic acid in addition to terephthalic acid; or (C) a polyester-polyamide formed by heating a mixture of about 50 to about 99% by weight of component (A) with about 1 to about 50% by weight of component (B) at a temperature above the melting points of components (A) and (B) for a sufficient period to effect ester-interchange.

2. The composition of claim 1 wherein said another component is component (A), said polyurethane being present in said composition in the range of about 10 to about 60% by weight of said composition, component (A) being present in said composition in the range of about 40 to about 90% by weight of said composition.

3. The composition of claim 1 wherein said another component is component (A), said component (A) being formed by the reaction of from about 30 to about 70% by mole of a polymeric fat acid having a dimeric fat acid content of at least about 65% by weight, from about 20 to about 40% by mole of azelaic acid, from about 20 to about 40% by mole of ethylene diamine and from about 20 to about 80% by mole of piperazine.

4. The composition of claim 1 wherein said another component is component (B), said polyurethane being present in said composition in the range of about 10 to about 25% by weight of said composition, component (B) being present in said composition in the range of about 25 to about 90% by weight of said composition.

5. The composition of claim 4 including component (A) which is present at a level of up to about 50% by weight of said composition.

6. The composition of claim 1 with about 10 to about 25% by weight of said polyurethane, and said another component consists of a mixture of components (A) and (B), component (A) being present in said composition at a level of up to about 50% by weight of said composition and component (B) being present in said composition at a level of from about 25% to about 90% by weight of said composition.

7. The composition of claim 1 wherein said another component is component (C), said component (C) being present in said composition at a level of up to about 75% by weight of said composition.

8. The composition of claim 2 with about 13% by weight of said polyurethane and about 87% by weight of component (A).

9. The composition of claim 1 with about 25% by weight of said polyurethane, about 25% by weight of component (A) and about 50% by weight of component (B).

10. The composition of claim 1 wherein said another component consists of a mixture of components (A) and (C), said polyurethane being present in said composition at a level of about 10 to about 60% by weight of said composition, component (A) being present at a level of up to about 90% by weight of said composition, component (C) being present in said composition at a level of up to about 75% by weight of said composition.

11. The composition of claim 1 wherein said polyurethane is the reaction product of polytetraethylene ether glycol and methylene di-para phenylene isocyanate.

12. The composition of claim 1 wherein said component (A) is formed by the amidification at a temperature in the range of about 200° F. to about 575° F. of
(i) about 30% to about 70% by mole of a polymeric fat acid having a dimeric fat acid content of at least about 65% by weight,
(ii) from about 20% to about 80% by mole of said compound of the formula YN<Z>NH,
(iii) from about 20% to about 40% by mole of a compound of the formula $R_2OOC$—$COOR_2$ or $R_2OOCR_3COOR_2$ where $R_2$ is selected from the group consisting of hydrogen, alkyl and aryl groups containing from 1 to 8 carbon atoms and $R_3$ is a divalent, aliphatic, cycloaliphatic or aromatic hydrocarbon radical having from 1 to 20 carbon atoms, and
(iv) from about 20% to about 40% by mole of a diamine of the formula $H_2NR_4NH_2$ where $R_4$ is selected from the group consisting of aliphatic, cycloaliphatic and aromatic hydrocarbon radicals having from 2 to 20 carbon atoms.

13. The composition of claim 1 wherein said component (B) is formed from the polyesterification of terephthalic acid, cyclohexanedimethanol, an aliphatic, cycloaliphatic or aromatic diol and an aliphatic, cycloaliphatic or aromatic dicarboxylic acid.

14. The composition of claim 13 wherein said diol for component (B) is selected from the group consisting of ethylene glycol, 1,6 hexane diol, or a mixture of ethylene glycol and 1,6 hexanediol.

15. The composition of claim 13 wherein said dicarboxylic acid for component (B) is azelaic acid.

16. The composition of claim 1 wherein component (C) is formed by heating a mixture of components (A) and (B) at a temperature in the range of from the melting point of components (A) and (B) to about 600° F.

17. The composition of claim 16 wherein components (A) and (B) are heated at a temperature of about 500° F.

18. The composition of claim 1 wherein component (C) is formed by heating a mixture of components (A) and (B) in the presence of an ester-interchange catalyst.

19. A method of forming a thermoplastic adhesive comprising extruding the composition of any one of claims 1–18.

20. The method of claim 19 wherein said composition is extruded at a temperature in the range of about 300° F. to about 425° F.

21. The method of claim 19 wherein the temperature of said composition is raised to a temperature of over about 300° F. and then said composition is subjected to high shear extrusion conditions.

22. A method of making a composite product comprising extruding the composition of any one of claims 1–18 on to a substrate.

23. The method of claim 22 wherein said substrate and said composition are co-extruded.

24. A method of making a composite structure comprising extruding the composition of any one of claims 1–18, applying the extruded composition to at least a portion of a first component of said composite structure as said extruded composition is extruded, placing a second component of said composite structure in contact with said extruded composition, and applying pressure to said second component to bond said second component to said first component.

25. The method of claim 24 with the step of cooling said extruded composition prior to placing said second component in contact with said extruded composition, and then applying heat to said extruded composition to bond said second component to said first component.

26. A hot melt adhesive comprising the composition of any one of claims 1-18.

27. The method of claim 24 wherein said first and said second components are made from the same or different materials, the material of each component being selected from the group consisting of polyurethane, polyolefin, polyurethane-polyolefin blend, polyvinylchloride, polyester or nylon.

28. The method of claim 27 wherein said first component is coextruded with said composition and said second component is a smooth, porous or woven structure.

* * * * *